United States Patent [19]
Diem

[11] 3,787,983
[45] Jan. 29, 1974

[54] ROLLER SUPPORT AND DRIVE ARRANGEMENT FOR ROLLER TESTING DEVICES

[75] Inventor: Rudolf Diem, Schweinfurt, Germany

[73] Assignee: SKF Kugellagerfabriken GmbH, Schweinfurt, Germany

[22] Filed: Jan. 26, 1971

[21] Appl. No.: 109,807

[30] Foreign Application Priority Data
Jan. 30, 1970 Germany.................. P 20 04 240.4
Feb. 3, 1970 Germany.................. P 20 04 629.1

[52] U.S. Cl.................. 33/174 Q, 51/49, 51/103 R, 269/57
[51] Int. Cl........................... B24b 5/18, A61b 5/10
[58] Field of Search......... 33/174 Q, 174 L; 269/57; 228/48; 51/103 R

[56] References Cited
UNITED STATES PATENTS
3,088,250   5/1963   Hold et al............................. 51/49
1,879,110   9/1932   Cramer.............................. 53/103 R
1,994,754   3/1935   Cramer.............................. 53/103 R
2,195,049   3/1940   Wallace............................. 53/103 R Primary Examiner—William D. Martin, Jr.
Assistant Examiner—Milton S. Gerstein
Attorney, Agent, or Firm—Richard Low; Murray Schaffer

[57] ABSTRACT

Support and drive means for use in apparatus for automatically inspecting the surface of bodies of rotation. The support means comprise a drive wheel and a plurality of rollers spaced therefrom. The body of rotation is arranged between the drive wheel and the rollers to rotate about its axis of rotation. Each of the rollers are independently mounted for free rotatary movement in contact with the surface of the body.

14 Claims, 4 Drawing Figures

PATENTED JAN 29 1974 3,787,983

*INVENTOR.*
RUDOLF DIEM

BY *Murray Schaffer*

ATTORNEY

ROLLER SUPPORT AND DRIVE ARRANGEMENT FOR ROLLER TESTING DEVICES

BACKGROUND OF INVENTION

The present invention relates to apparatus for testing bodies of rotation and in particular for supporting and driving such bodies as conical roller bearings in automatic machines for testing the surface quality thereof.

This application is a companion to application Ser. No. 109,808, and now abandoned, filed on even date herewith based on German Pat. application P 20004 628.0 filed Feb. 3, 1970. The companion case discloses related structure having similar function. Its disclosure is incorporated herein and all legal and equitable benefits derivable therefrom are claimed.

As the final step in the manufacture of precision and high quality bearings, conical rollers, as well as cylindrical, spherical, barrel, and other types of roller bodies are subjected to an inspection of their entire surface for such flaws as cracks, holes, scratches, and other irregularities in surface uniformity. Conventionally, the sensor head or probe of a chosen optical, electro-inductive, photo-electrical, tactile, or other known sensing system is made to sequentially scan the entire surface of the body. Suitable circuitry, mechanism, etc., designed to determine the accuracy, quality, and frictionless performance of the body, are employed to interpret the information scanned. To obtain an accurate result it is necessary to rotate the bearing body so that the relative movement between it and the sensor exposes the entire surface of the body to the scanning beam or probe.

Conventionally, the conical roller bearing body to be tested is supported and driven by a pair of non-parallel cylindrical plastic rollers which support it over a large portion of its length and which are driven to rotate and feed the body longitudinally with respect to the sensor. In order to insure positive traction the conical body is pressed against the supporting rollers by a fixed rail or guide made of plastic or other low frictional material. To compensate for changes in spacing between the supporting rollers (whose axes are not parallel) caused by the passage of the conical body, at least one of the plastic cylindrical supporting rollers must be journalled to allow oscillating movement transverse its longitudinal axis.

Another arrangement is known in which the conical body to be tested is supported between a friction drive wheel and a pair of cylindrical backing rollers. The backing rollers are located opposite to the drive wheel, one on each side of the body and are cylindrical extending across a substantial portion of the length of the conical body to be tested.

When a conical body is backed or supported by cylindrical rollers of significant length (large, relative to the length of the conical body to be tested) the conical body cannot be rotated to produce exact rolling movement. Cylindrical rollers when rotating about their respective axes have not only the same angular velocity in each radial plane, along its axis, but also the same circumferential velocity, because of its uniformly equal diameter. A conical body, however, has the same angular velocity during rotation about its axis, in each radial plane along the axis, but because of the variation in diameter along the axis it has different circumferential velocities. That means that when a conical body is supported or driven by cylindrical rollers or significant length an exact rolling movement cannot occur since at each point where relative rolling movement occurs a simultaneously axial component of movement occurs. This causes the conical body to slide axially with respect to the supporting cylindrical rollers. So it is, in each of the known testing devices described that the surface of the conical roller to be tested is effected and changed by the sliding movement created by the differences between it and the cylindrical supporting rollers. As a consequence, the test result does not correspond to actual fact and to the ultimate product. Such differences are not tolerable under the exact and precise quality requirement of this art.

It is an object of the present invention to provide in a testing machine a support and drive arrangement for conical roller bearings or bodies which overcome the disadvantages of the prior known arrangements.

It is another object of the present invention to provide in a testing device for bodies of rotation, a support and drive arrangement which provide precise rotational movement without an axial component.

It is another object of the present invention to provide support and drive means in an automatic inspection device for rotating bodies which provide a more accurate and precise testing result.

The objects as well as other together with numerous advantages will be apparent from the following description.

SUMMARY OF INVENTION

According to the present invention testing and inspection apparatus is provided with apparatus for supporting and driving a body of rotation about its axis of rotation comprising an array of backing rollers spaced about the circumference of said body. One of the rollers is driven. At least two of the rollers are independently rotatable and shaped to conform to the shape of said body to have a constant angular and circumferential velocity, at the point of contact, when conjointly rotated.

According to another feature of the present invention the inspection device is provided with support and drive means comprising a drive wheel and a plurality of rollers between which the body of rotation is arranged to rotate about its axis. The rollers are independently mounted for free rotation in contact with the surface of the body of rotation and are disk shaped.

Preferably the rollers are symmetrically arranged within the ends of the body. Four in number are provided, arranged in pairs on either side of the body. The surfaces of the rollers may be cylindrical, arcuate, or conical and are preferably of a diameter conforming to the diameter of the body at the point of contact.

When conical rollers are used with a conical body the generating lines intersect in a point.

In accordance with still another feature of the present invention, apparatus specifically for use with conical bodies is provided in which the rollers are conically shaped and are mounted about an axis which is rotatably journalled. The conical rollers conform to the shape of the body and preferably the generating lines of the circumference of the body and rollers extend to meet at a point.

In this latter form the conical rollers may be unitary or may be formed of a plurality of shaped roller disks which may or may not be interconnected.

Full details of the present invention are set forth in the following description.

BRIEF DESCRIPTION OF THE DRAWINGS

In the description reference is made to the accompanying drawing in which.

DESCRIPTION OF INVENTION

Before turning to the description of the present invention it is noted that the drawings are in schematic form having omitted from its various details of construction which are well known to those skilled in the art. In addition the details of the scanning, sensing and test system are also omitted since any one of the conventional systems may be used in their well known manner. A full understanding of the present invention can be made without such details.

Figure 1:
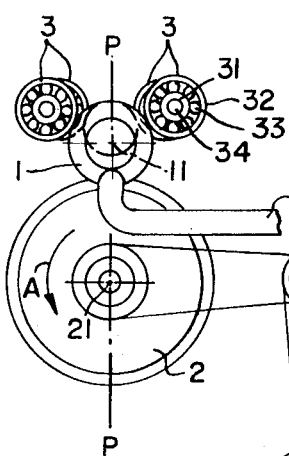
FIG. 1 is a schematic line, end view of the present invention showing the body arranged between the support and drive means.

Turning now to FIG. 1, the present invention is adapted to support and drive a body of rotation 1, such as a conical roller for a bearing, which is to be tested. The conical roller is pressed with a constant force against a drive wheel 2 by a plurality of freely rotatable disk shaped rollers 3 between which it is arranged. The body 1 axially abuts against a stop 4. The drive wheel 2 is provided with an arcuate rim 5 of sufficient friction to drive the body 1. The bodies 1 are fed in axial alignment from a hopper H or conveyor to a movable slide S which is intermittently actuated to allow a single body at a time, to move into the area between the drive wheel 2 and rollers 3.

The drive wheel 2 is mounted on shaft 21 journalled in a suitable bearing 22 for rotation about the axis of the shaft. Suitable drive means including a motor M and transmission T are connected to the shaft 21 to drive the wheel at a predetermined or even variable speed in the direction of the arrow. The body 1 which is being tested is arranged to have its outer surface 12 rest on the rim 5 and to have its own axis 11 extending in a radial plane P—P through the shaft 21 of the drive wheel so that the drive wheel 2 is arranged transversely of the body 1 and substantially at its longitudinal center. The shaft 21 of the drive wheel 2 may be arranged in a horizontal plane parallel to ground so that the axis 11 of the conical roller body 1 is at an oblique angle to both ground and the shaft 21 and the of the rotating surface 12 form a line, in cross section, at the top away from the wheel 2 which is parallel to ground. The plane P-P may be vertical.

Each of the backing rollers 3 are formed as conventional ball bearing assemblies having an inner race 31 and an outer race 32 separated by a plurality of bearing balls 33. Each roller 3 is fixed about an axle 34 which is independently secured or attached to the frame or housing of the machine by a suitable holder such as a movable bracket, arm or other conventional support F. Means such as compression springs, resilient rubber pads, adjustable screw arrangements, or other means may also be provided so that the holders may allow the rollers to swing or open to permit entry and arrangement of the body between them and the drive wheel 2 so that the body 1 is rotated about its central axis of rotation 11 and is pressed against the drive wheel 2 with sufficient constant forces to insure traction without skipping or binding. Preferably, however, the drive wheel 2 is journalled on bearings which are slidably adjusted vertically in the plane P-P so that the drive wheel may be intermittently lowered to permit entry of the rollers to be tested from a supply hopper H. The lowering of the drive wheel 2 permits the tested roller 1 to be removed manually or automaticaly so that thereafter the next roller to be tested can slide between the backing rollers 3 and abut against the stop 4. Thereafter the drive wheel is elevated and testing begins with the roller 1 properly arranged.

Figure 2:
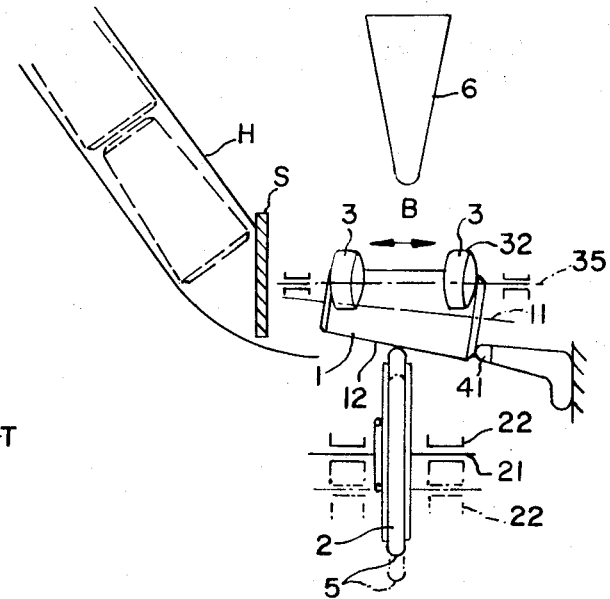
FIG. 2 is side view in similar form of the apparatus seen in FIG. 1, and FIGS. 3 and 4 are views similar to that of FIGS. 1 and 2 respectively showing other embodiments of the present invention.

Four disk shaped backing rollers 3 are provided. The rollers 3 are relatively narrow with respect to the length of the body to be tested and are arranged in pairs symmetrically to the left and right side of the plane P—P, as seen in FIG. 1. The combined effect of the rollers 3 is to produce a vector force diametrically opposed to the drive wheel 2. Each backing roller pair is arranged so that their centers of rotation are coaxial, extending under normal conditions along a common line 35, as seen in FIG. 2. The lines 35 lie above the axis of rotation of the body 1. The surface of the outer race 32 of the rollers 3 may be cylindrical, convexedly curved (barrel shaped) or conical. When these surfaces are conically formed, the rollers 3 are preferably arranged so that the generatrix of the outer race surfaces at the point of contact and of the body 1 which is being tested would if extended intersect in a point. The rollers 3 may be of equal diameter or they may successively be of steppedly varying diameters. The stepped size of the rollers 3 would then conform to the tapered or conical shape of body 1 at the point of contact so that the desired surface or circumferential velocity is obtained.

Each of the rollers 3 in each of the axially aligned pairs are spaced symmetrically from one another but lie within the longitudinal bounds or axial ends of the conical body which is to be tested. Preferably they are arranged to lie adjacent the ends of the body.

The abutment or stop 4 may be a conventional arm or movable lever attached to the frame or support F. To avoid unnecessarily scratching or damaging the frontal end face of the conical roller body 1 against which it abuts, the finger 4 may be provided with a roller or ball bearing 41 so that free rotation of the conical body 1 is insured.

The rim 5 may be made of suitable friction material. Preferably it is convex or barrel shaped so as to provide tangential contact with the surface 12 along the axis of body 1 in an oblique angle to the surface 12. This reduces even further the possibility of damage to the surface 12 since the point contact reduces the tendency of the roller to slide and the resultant force is to press the body 1 against the abutment 4.

The scanning device is generally arranged so that its probe, scanning head, or sensor is incident upon or is directed between the paired rollers 3 and may be provided with means to traverse the length of the conical roller 1. As an illustration the drawing shows the head 6 of an optical sensor located and arranged to oscillate along the path B parallel to the upper surface of the body 1, which is to be tested. If desired scanning probes or sen-sor heads may also be arranged to scan the frontal or flat end faces of the rotating body.

It will thus be seen that the body of rotation which is to be tested, as for example the body 1, is securely held within the grasp of the cooperating drive wheel 2 and the rollers 3, which in cross section provide a triangular array about the circumference of the body to be tested. The body is positively driven at a uniformly constant rate. The disk shaped, independently mounted rollers 3 assume the circumferential velocity prevailing in the immediate contact area between them and the corresponding portion of the body 1. Thus the backing roller 3 at the narrow end of the body has a velocity equal to that of the body 1 at that end and the backing roller 3 at the base of the body has a velocity corresponding to that of the base of the body. In this manner any axial component of force created by the relative rotation of the body to be tested and the respective backing rollers and the drive wheel is avoided and therefore relative axial sliding movement is completely obviated. This condition prevails, even though the rollers 3 have cylindrical, or arcuate faces and even though the rollers 3 themselves are made conical as noted.

Figure 3:
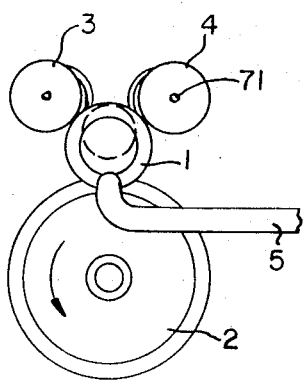
Figure 4:
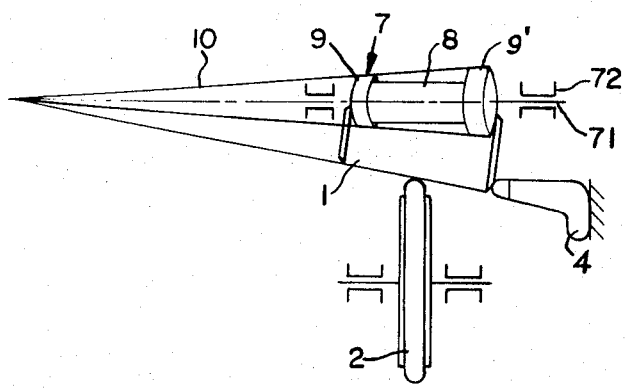

Other embodiments of the present invention are seen in FIGS. 3 and 4. Here the body 1 is also illustrated as being driven by a drive wheel 2 arranged, journalled and powered in the same manner as previously described. The body 1, however, is supported or backed by a pair of conical rollers 7 each fixed about a shaft 71 journalled for rotation in suitable bearings 72.

The conical rollers are symmetrically arranged, similar to the arrangement previously shown, about the circumference of the body 1 so as to obtain a force or pressure component opposite to the wheel 2 whereby the body 1 is securely yet freely rotatably supported therebetween. The two rollers 7 are rotatably independent of each other and may freely revolve about shaft 71, or in the bearing 72 or may be driven or powered independently or in conjunction with the drive wheel 2.

The conical rollers 7 may take a variety of forms. They may be unitarily formed with full conical exterior surface which is fully in contact with the surface of the body 1 along its entire length. They may be formed as a plurality of axially juxtaposed contiguous roller bearings similar to those described earlier; in this event the disk shaped rollers may be interconnected for unitary or conjoint rotation or may each be independently rotatable with respect to each other even though they may be journalled on a common shaft. The rollers may also be formed as seen in FIG. 4, having a central recess or indentment 8 and an annular extending collar 9 and 9' at each end, the surface of which is adapted to contact the surface of the body 1, being tested. Collars 9 and 9' may be separable from the central portion 8 and may be each freely rotatable on the common shaft 71 or with respect to it about the indentment 8. On the other hand the collars 9 and 9' and the central portion may be integrally formed and conjointly rotatable with the indentment.

In any event the rollers 7 are conically shaped to conform to the shape of the body 1 to be tested. That is; if the entire surface is formed to contact the body 1, then the roller 7 is shaped as a truncated cone. If the roller is formed as a plurality of axially juxtaposed disk shaped rollers then each successive roller is of a different diameter, stepped or successively decreasing from one end to the other of the body to be tested, so that an overall conical shape is obtained by the total sum of rollers along each side of the body to be tested. In this latter form each roller may itself be conically shaped to provide, in-toto, an overall uniformly conical shape. In the form seen in FIGS. 3 and 4 the annular collars 9 and 9' are preferably both conically formed of different diameters to obtain the overall conical shape.

In any event, the conical rollers 7 (no matter what form) are shaped and are arranged on shafts 71 and journals 72 so that while their surfaces and that of the body 1 are in contact with the body 1, the lines 10 generated by all their respective circumferential surfaces, when extended, intersect in a single point. In this manner, the angular and circumferential velocities of each of the rollers and the body to be tested are equal and constant at each point of contact between them. The advantages noted earlier are all equally applicable here.

As in the earlier embodiment, it is preferable that the supporting element or rollers be located within the axial length of the body to be tested and preferably extending as close to the end of the body 1, as is possible. Further, the end stop 4 and ball roller bearing are also provided as is the wheel rim 5. It will again be noted that since the wheel 2 and the surface of the body 1 which it is in contact with are arranged angularly, or obliquely relative to each other so that the generatrices of rotation are oblique, then the possibility of axial sliding is avoided since the forces tend to maintain the body 1 constantly abutting against the stop 4. The sensor head may be located as desired.

In general, it will be obvious, that various combinations of the structures depicted and described herein can be made. For example a roller or a pair of rollers shown in FIGS. 1 and 2 may be substituted for one of the rollers of FIGS. 3 and 4. Since as noted, the conical backing or supporting rollers 7 could be powered or driven, one such roller could replace or substitute for the drive wheel 2 if desired.

Another advantage arises from the present invention in that it is possible to avoid the excessive use of backing rollers over the entire axial extent of the conical roller which is to be tested. With the form shown in FIGS. 3 and 4, only two conical backing rollers are required. As indicated otherwise it is only necessary to provide backing rollers 3 or collar surfaces 9 and 9' at the forward and rear ends of the body. Thus as few as four contacting rollers are required.

Still another advantage arises from the fact that the backing rollers may be simple ball or roller bearing anti-friction devices. Special bearings and special backing roller constructions are unnecessary. In lieu of ball bearings, conical or tapered bearings may be employed.

It is obvious that the conical or semi-conical bodies of rotation and even cylindrical bodies of rotation can be driven by the present device. Numerous modifications, changes and equivalent structures and functions have been disclosed; others will be obvious to those skilled in this art. For example the backing rollers may be driven by the motor means rather than the "drive" wheel and the position of the wheel and rollers may be physically inverted. It is to be therefore, understood that the present disclosure is intended only to illustrate the present invention and not to be limiting in any manner of its scope.

What is claimed:

1. Apparatus for automatically finally inspecting the outer surface of a body of rotation, comprising in combination with said body of rotation, a sensor spaced from the body of rotation adapted to sequentially scan the reflection from the outer surface of said body of rotation and apparatus for supporting and driving said body about its center of rotation with respect to said sensor comprising a drive wheel adapted to engage the outer surface of said body of rotation, a plurality of rollers spaced therefrom between which said body of rotation is arranged, and stop means located at the frontal end of said body, each of said rollers lying axially within the longitudinal ends of said body of rotation and comprising at least one disk shaped member substantially narrower than the body of rotation and respectively mounted relative to each other for independent rotary movement, said member being the outer race of an anti-friction bearing and of said body of rotation in contact with the outer surface of said body of rotation and having a surface conforming to the outer surface of said body of rotation at the place of contact therewith.

2. The apparatus according to claim 1 wherein said body of rotation is conical and said respective rollers each having a diameter stepped with respect to the others to conform to the diameter of said body at the place of contact therewith.

3. The apparatus according to claim 1 wherein the surfaces of said rollers are cylindrical.

4. The apparatus according to claim 1 wherein the surfaces of said rollers are arcuate.

5. The apparatus according to claim 1 including means for mounting said rollers to provide a constant pressure on said body of rotation.

6. The apparatus for automatically finally inspecting the outer surface of a conical body of rotation by scanning the reflection from said outer surface, apparatus for supporting and driving said body about its center of rotation vomptidinh including stop means located at the frontal end of said body, three rollers spaced about the circumference of said body in a triangular array with their surfaces in contact with the surface of said body and lying axially within the longitudinal ends of said body of rotation, two of said rollers being freely rotatable and conically shaped to have a surface which conforms to the surface of said body and one of said rollers comprising a drive wheel having its rim engaging the surface of said body centrally of its axial length, said wheel extending transversely to said two rollers and being driven to rotate said body about its axis of rotation.

7. The apparatus according to claim 6, wherein said rollers and said body are arranged so that the generated lines of their circumferential surfaces intersect in a point.

8. The apparatus according to claim 7 in that each of the conical rollers is formed of a plurality of axially juxtaposed parallel disks mounted contiguous to each other upon a common shaft.

9. The apparatus according to claim 8 wherein each of said disks are independently rotatable.

10. The apparatus according to claim 8 wherein each of said continguous disks are interconnected with each other for conjoint movement.

11. The apparatus according to claim 7 wherein each conical roller comprises a central portion and a pair of annular collar members at each end, said collar members being of different diameters and being adapted to engage the surface of said body to be tested with the axial extent of said body.

12. The apparatus according to claim 11 wherein said collar members are independently rotatable with respect to said central portion.

13. The apparatus according to claim 11 wherein the surface of said collar members are conical.

14. The apparatus according to claim 6 wherein the axis of said drive wheel is arranged at an angle to the axis of the body of rotation thereby to obtain an oblique angle between the drive wheel and the surface of said body at the point of contact.

* * * * *